United States Patent
Morrison

(10) Patent No.: US 6,341,445 B1
(45) Date of Patent: Jan. 29, 2002

(54) LANDSCAPE BARRIER DEVICE WITH WATERING SYSTEM

(76) Inventor: John W. Morrison, Rte. 3, Box 3537B, Athens, TX (US) 75751

( * ) Notice: Subject to any disclaimer, the term of this patent is extended or adjusted under 35 U.S.C. 154(b) by 1 day.

(21) Appl. No.: 09/121,645

(22) Filed: Jul. 12, 1999

(51) Int. Cl.[7] .................................................. A01G 1/08
(52) U.S. Cl. ............................................................ 47/33
(58) Field of Search .............................. 47/33; 52/102; 404/6, 7; 239/276, 279

(56) References Cited

U.S. PATENT DOCUMENTS

| | | | | |
|---|---|---|---|---|
| 5,535,545 A | * | 7/1996 | Matz | 47/33 |
| 6,021,599 A | * | 2/2000 | Matz | 47/33 |
| 6,138,405 A | * | 10/2000 | Matz | 47/33 |

FOREIGN PATENT DOCUMENTS

| | | | |
|---|---|---|---|
| FR | 2565063 | * 12/1985 | 47/33 |

* cited by examiner

*Primary Examiner*—Peter M. Poon
*Assistant Examiner*—Jeffrey L. Gellner

(57) ABSTRACT

A landscape barrier device is provided which may be used to segregate dissimilar landscaping schemes by positioning sections of the device immediately adjacent to each other. The landscape barrier device also provides an integral sprinkler system, which allows controlled watering of the landscape scheme on one side of the device by flowing water through the device and out flow ports provided on the device. Used in this manner, the device may be used to satisfy the different watering requirements of the segregated landscape schemes. Alternatively, the device may be used to provide supplemental watering to the landscape schemes on both sides of the device.

4 Claims, 1 Drawing Sheet

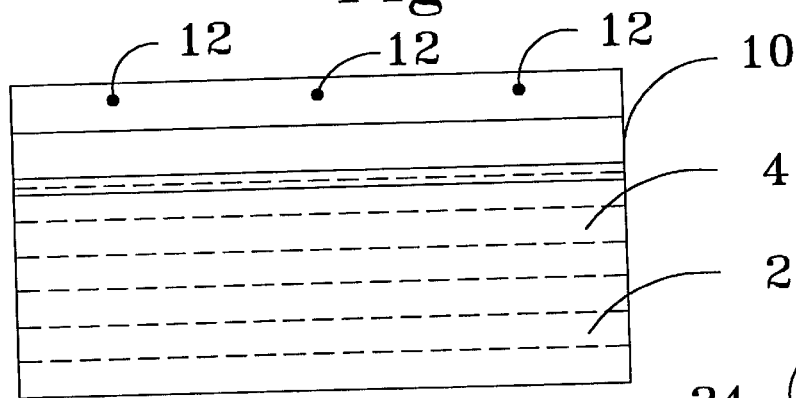
Fig. 1
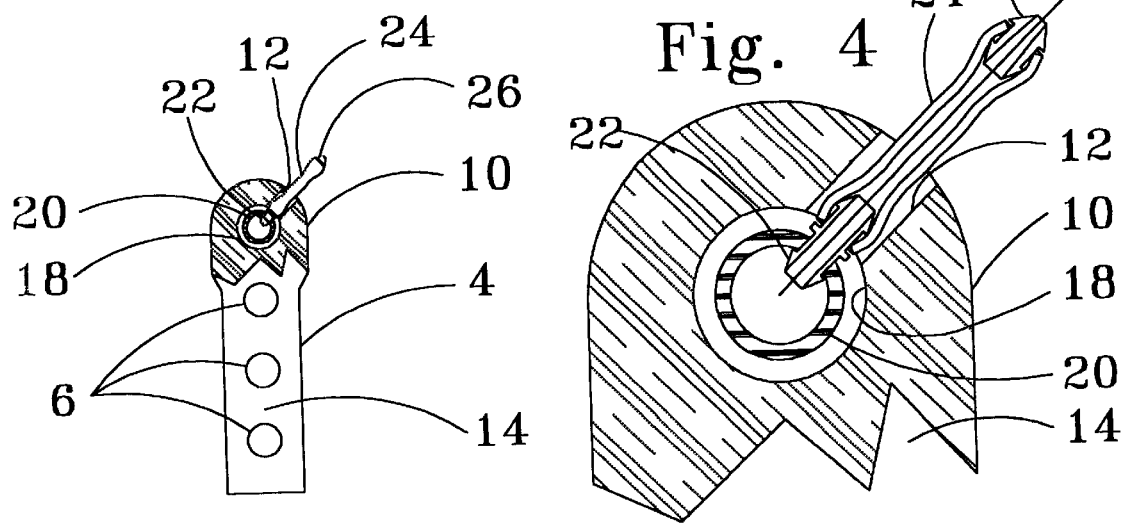
Fig. 2
Fig. 4
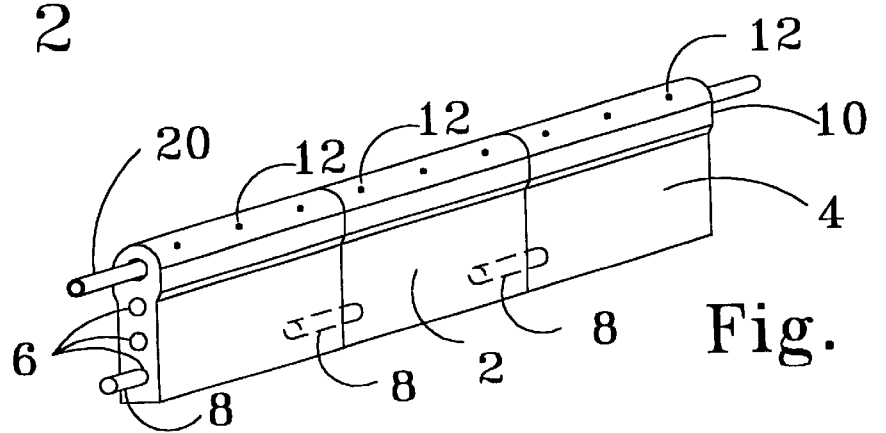
Fig. 3

LANDSCAPE BARRIER DEVICE WITH WATERING SYSTEM

BACKGROUND OF THE INVENTION

This invention relates to the problem of segregating an area of a garden or landscape scheme from a dissimilar neighboring landscape. In particular, the invention also relates to the problems that arise when the moisture requirements of one section of a garden or landscape scheme are different from the neighboring landscape.

There are numerous domestic and commercial applications in which it is desirable to separate dissimilar forms of vegetation, or landscape schemes. Of the various applications, there are numerous reasons for the need to separate landscape schemes including aesthetics, incompatibility with neighboring vegetation, and differences in climatic requirements.

There are a number of well-known landscape barrier systems currently available including wooden logs, flexible metal strips, flexible plastic strips, clay forms, stone, and brick. All of these systems are known to satisfactorily segregate the landscape schemes with certain differences noted in their overall performances.

A primary limitation of the existing systems is their inability to address the problem that arises when segregated landscape schemes have different moisture requirements. The traditional solution is for the landscaper to install a sprinkler system directed exclusively towards the moisture demanding landscape scheme. This requires substantial time, effort, and expense. Very often, the segregated landscape scheme occupies too small of an area to justify or physically allow for a sprinkler system installation. In these cases, the vegetation may suffer from improper watering.

SUMMARY OF THE INVENTION

In carrying out the principles of the present invention, in accordance with the preferred embodiment thereof, a landscape barrier device is provided which is used by positioning like sections of the device end-to-end, immediately adjacent to each other. This method of placement forms a contiguous row of device sections along the path for which segregation of the landscape schemes is desired. The top section of the device contains a hollow passage into which a pipe or hose is installed such that it extends through the entire length of the contiguous row of device sections. On one end of the pipe or hose, a water supply is connected. The opposite end of the pipe or hose is capped or plugged. There is a plurality of flow ports located in a top section of the device. The landscaper installs self-sealing emitters into the flow ports, so that the emitters penetrate and seal against the pipe or hose. The installation of the emitters opens a passage in the pipe or hose contiguous with the hollow interior of the emitters so that water flowing through the pipe or hose will be directed out through the emitters in their location in the flow ports and onto the landscape scheme. Nozzles may be attached to the emitters to provide distributed spray patterns to the landscape scheme. Conduits of various lengths may be place between the emitters and nozzles to adjust the height of the distributed spray patterns above certain landscape schemes. Also disclosed is the method of making a landscape barrier device including the steps of mixing a clay mud, extruding the clay mud mixture through a die of a predetermined shape to form an elongated extrusion, forming at least one elongated hole throughout the length of the extrusion, cutting the extrusion into predetermined lengths, and heating the lengths of extrusion to cure the clay.

BRIEF DESCRIPTION OF THE DRAWINGS

FIG. 1 shows a side view of a front side of a landscape barrier device having a plurality of flow ports shown which provide for controlled watering of the landscape scheme on a front side of the device.

FIG. 2 shows an end view of the landscape barrier device, including a partial section through the top section of the device.

FIG. 3 shows an isometric view of multiple sections of the landscape barrier device, connected together at their ends.

FIG. 4 shows an enlarged end sectional view of the top section of the landscape barrier device with the detail of the flow port area.

DETAILED DESCRIPTION

Referring to FIGS. 1, 2 and 3 there is shown a front side 2 of a side view of the landscape barrier device. A base section 4 is shown which is generally rectangular in shape. In the base section, at least one alignment hole 6 can be seen on each end of the landscape barrier device as represented by the hidden lines. Protruding from alignment hole 6, is dowel 8. Dowel 8 will be used for aligning the landscape barrier device to adjacent sections of the same device. Attached to the top of base section 4 is a top section 10. Located in top section 10 is a plurality of flow ports 12. In the prefer embodiment, flow ports 12, are located on front side 2 of top section 10, to direct watering to a selected side of the landscape barrier device.

Referring to FIGS. 2 and 4, an end face 14 is shown. Base section 4 is shown to include a plurality of alignment holes 6. Shown attached to the top of base section 4 is top section 10. Located within top section 10 is a hollow passage 18, which intersects flow ports 12. Inside hollow passage 18 is a hose 20.

Inside flow ports 12 are self-sealing hollow emitters 22, which are inserted into hose 20. As emitters 22 are inserted into hose 20, they perforate hose 20 so that water flowing inside of hose 20 will flow through the hollow interior of emitters 22. As emitters 22 are inserted into hose 20, they prevent rotational and lateral movement of hose 20 within hollow passage 18.

Referring to FIG. 3, there is shown an isometric view of multiple sections of the landscape barrier device, connected and aligned at the ends. This method of placement forms a contiguous row of device sections along the path for which segregation of the landscape schemes is desired. From this view it can be seen that hose 20 extends through each of the adjacent sections of the device. It can be further seen that dowel 8 extends between, and in alignment of, each of the adjacent sections of the device.

Referring to FIG. 4, emitter 22 can be seen inserted in flow port 12 so as to intersect hose 20. To accomplish this, a means for penetrating hose 20 is used such as by hand tools, electric drill or by puncture with the emitter. Attached to the end of emitter 22 is conduit 24. Attached to the opposite end of conduit 24 is nozzle 26. In this configuration, water flowing under pressure through hose 20 will enter emitter 22, pass through conduit 24, and exit nozzle 26 in a distributed spray pattern. Conduit 24 may be varied in length to accommodate vegetation of various heights over which it is necessary to distribute water. In the preferred embodiment, nozzle 26 is adjustable and replaceable, so as to vary the flow rate and pattern of the distributed spray. In an alternative embodiment, emitter 22 has a nozzle 26 attached or formed integrally with it's opposite end, eliminating the need for an intermediate section of conduit 24. In an alternative embodiment, flow port 12 is positioned vertically above top section 10, and nozzle 26 is selected to provide the desired distributed spray pattern from that position.

In addition to the landscape barrier device described above there is disclosed a method of manufacturing a landscape barrier. In this method, a raw clay, water and a hardening agent commonly know as "flux." is mixed into a mud as is well known in the art as used to make clay flower pots. The clay is mixed to a proper consistency, and extruded through a die to from an extrusion of the clay to a predetermined length. The shape may be that illustrated in FIG. 2. The extrusion is cut to length, then heated in an oven or kiln to a temperature sufficient to cure or fire the clay, to the desired hardness which is sufficient to form the desired barrier between two landscape schemes. A clay mixed as described above, then hardened by being fired in a kiln or oven is commonly known as a ceramic.

Although elements of the invention have been illustrated in the accompanying drawings and described in the foregoing Description it will be understood that the invention is not limited to the embodiments disclosed, but is capable of rearrangements, modifications, substitutions and reversals of parts and elements without departing from the spirit of the invention.

I claim:

1. A landscape barrier device comprising:

a base section having a first end and an opposite second end;

a top section attached to the top of said base section, and having a front side, and an opposite back side;

a hollow passage located in said top section and extending throughout the length of said top section;

a plurality of flow ports through said top section, and intersecting said hollow passage in said top section;

a means for conducting water through said hollow passage in said top section; and a means for channeling water from said hollow passage in said top section into said flow ports, said means for conducting comprising a hose located inside of said hollow passage, said means for channeling water comprises a means for perforating said hose coincident with the intersection of said flow ports whereby water may flow through said hose and exit said hose where perforated and flow through said flow ports, and said means for channeling water further comprises a plurality of self-sealing hollow emitters inserted through said flow ports such that said emitters intersect and seal with said hose and thereby provide a channel for water from said hose to flow through said flow ports.

2. A landscape barrier device as recited in claim 1, further comprising:

a plurality of nozzles attached to said hollow emitters such that water flowing through the hollow center of each said emitter will exit one of said nozzles in a distributed spray pattern.

3. A landscape barrier device as recited in claim 1, further comprising:

a plurality of conduits attached to said hollow emitters such that water flowing through each said emitter will continue to flow through one of said conduits; and a plurality of nozzles attached to said conduits such that water flowing through each said conduit will exit one of said nozzles in a distributed spray pattern.

4. A landscape barrier device as recited in claim 3, in which said end attaching means comprises:

at least one attachment hole matchingly located in each of said first end and said second end of said base; and at least one dowel pin located inside and extending between said attachment hole in said first end of a landscape barrier device and said attachment hole in said second end of an immediately adjacent landscape barrier device.

* * * * *